US011255256B2

(12) United States Patent
Ganser et al.

(10) Patent No.: US 11,255,256 B2
(45) Date of Patent: Feb. 22, 2022

(54) AIR-GUIDING SECTION FOR AN EXHAUST TURBOCHARGER AND EXHAUST TURBOCHARGER

(71) Applicant: IHI Charging Systems International GmbH, Amt Wachsenburg OT Ichtershausen (DE)

(72) Inventors: Jürgen Ganser, Urbach (DE); Timm Kiener, Ludwigsburg (DE)

(73) Assignee: IHI Charging Systems International GmbH, Amt Wachsenburg OT Ichtershausen (DE)

( * ) Notice: Subject to any disclaimer, the term of this patent is extended or adjusted under 35 U.S.C. 154(b) by 87 days.

(21) Appl. No.: 16/965,232

(22) PCT Filed: Feb. 26, 2019

(86) PCT No.: PCT/EP2019/000058
§ 371 (c)(1),
(2) Date: Jul. 27, 2020

(87) PCT Pub. No.: WO2019/170280
PCT Pub. Date: Sep. 12, 2019

(65) Prior Publication Data
US 2021/0363916 A1    Nov. 25, 2021

(30) Foreign Application Priority Data

Mar. 9, 2018    (DE) .......................... 102018105518.8

(51) Int. Cl.
*F02B 37/22* (2006.01)
*F01D 17/14* (2006.01)
*F04D 29/46* (2006.01)

(52) U.S. Cl.
CPC .......... *F02B 37/225* (2013.01); *F01D 17/141* (2013.01); *F04D 29/464* (2013.01);
(Continued)

(58) Field of Classification Search
CPC .... F02B 37/225; F01D 17/141; F01D 17/146; F04D 29/464
See application file for complete search history.

(56) References Cited

U.S. PATENT DOCUMENTS 803,041 A * 10/1905 Wilkinson ............ F04D 29/464
415/150
3,672,786 A    6/1972 Mount
(Continued)

FOREIGN PATENT DOCUMENTS

DE    102012011423    11/2013
DE    102010026176    12/2015
(Continued)

*Primary Examiner* — Eldon T Brockman
*Assistant Examiner* — Brian O Peters
(74) *Attorney, Agent, or Firm* — Smartpat PLC

(57) ABSTRACT

An exhaust turbocharger includes an air-guiding section. A spiral channel is formed downstream of a wheel chamber in the air-guiding section. Between the wheel chamber and the spiral channel, a diffuser channel is formed in the air-guiding section. Upstream of the wheel chamber, an inlet channel is formed in the air-guiding section for the inflow of fluid to be compressed. In the inlet channel, a cross-section-changing unit. The cross-section-changing unit comprises an operating element with at least two movable element parts to produce a baffle which can protrude, with the aid of an adjusting unit, into the inlet cross-section rotationally and/or in a translational manner or can be removed from the inlet cross-section. The two element parts are fixedly disposed at one element end jointly in the air-guiding section. A relative movement of the element parts can be brought about in particular in an opposing direction.

8 Claims, 7 Drawing Sheets

(52) U.S. Cl.
 CPC ........ *F01D 17/146* (2013.01); *F05D 2220/40* (2013.01); *F05D 2250/51* (2013.01)

(56) References Cited

U.S. PATENT DOCUMENTS

| | | | | |
|---|---|---|---|---|
| 4,513,948 | A | * | 4/1985 | Konig ........................ F16K 3/03 |
| | | | | 251/212 |
| 4,532,961 | A | * | 8/1985 | Walton .................... F16K 3/085 |
| | | | | 137/625.31 |
| 10,570,905 | B2 | * | 2/2020 | Mohtar ................. F04D 29/462 |
| 2016/0177956 | A1 | | 6/2016 | Mohtar et al. |
| 2017/0298953 | A1 | | 10/2017 | Lombard et al. |
| 2019/0195122 | A1 | | 6/2019 | Taylor et al. |

FOREIGN PATENT DOCUMENTS

| | | | |
|---|---|---|---|
| EP | 3043045 | A2 | 7/2016 |
| EP | 3236077 | A1 | 10/2017 |
| WO | 2018045153 | A1 | 3/2018 |

\* cited by examiner

AIR-GUIDING SECTION FOR AN EXHAUST TURBOCHARGER AND EXHAUST TURBOCHARGER

TECHNICAL FIELD

The disclosure relates to an air-guiding section for an exhaust turbocharger and to an exhaust turbocharger.

BACKGROUND

Air-guiding sections for exhaust turbochargers which have a changeable inlet cross-section upstream of the compressor wheel of the air-guiding section are known. These changeable inlet cross-sections ensure a so-called characteristics-stabilizing measure. In other words, this means that a shifting of a surge limit of the operating complex formed by the air-guiding section and the compressor wheel is brought about.

DE 10 2010 026 176 B4 discloses an air-guiding section which, in its inflow channel upstream of the compressor wheel, has a movable element which is designed to be able to cover an end face of the compressor wheel facing it, wherein the covering is effected starting from a channel wall of the inflow channel in the direction of a channel middle of the inflow channel.

A comparable procedure for reducing the channel cross-section can be found in patent document DE 10 2012 011 423 B3. In that case, an elastic element is disclosed which, starting from the channel wall, expands by the supply of compressed air in the direction of the channel middle in order thus to reduce the inlet cross-section.

SUMMARY

The object of the disclosure is to provide an improved air-guiding section for an exhaust turbocharger. Furthermore, it is the object of the disclosure, to provide an exhaust turbocharger which is characterized by a high level of efficiency.

These objects are achieved by an air-guiding section for an exhaust turbocharger as disclosed and by an exhaust turbocharger as disclosed.

An air-guiding section for an exhaust turbocharger which is designed to be able to have a flow passing through it comprises a wheel chamber for rotatable reception of a compressor wheel having a plurality of rotor disk blades. Furthermore, a spiral channel is formed downstream of the wheel chamber in the air-guiding section, wherein, between the wheel chamber and the spiral channel, a diffuser channel is formed in the air-guiding section. Upstream of the wheel chamber, an inlet channel is formed in the air-guiding section for the inflow of fluid to be compressed, wherein a cross-section-changing unit to change an inlet cross-section of the inlet channel is disposed in the inlet channel. The cross-section-changing unit for changing the inlet cross-section has an operating element which has at least two movable element parts to create a baffle, which element parts are designed to be able to protrude, with the aid of an adjusting unit, rotationally and/or in a translational manner into the inlet cross-section or to be able to be fully removed from the inlet cross-section.

The design of the cross-section-changing unit permits rapid opening and closing within fractions of a second as required for operation in automobile applications. Furthermore, in contrast to many known designs, the space requirement upstream of the compressor is very small; in this way, the system can be integrated into currently known/common installation spaces without significant changes being made.

In one embodiment of the air-guiding section, the element parts have operating sections which, facing each other, form a through-flow opening. Therefore, in particular when the operating sections are concave, the through-flow opening can easily be produced by an opposing arrangement of the element parts.

The operating sections can then preferably be designed to form a circular periphery when the operating element is in the closed state, since the inlet channel of the air-guiding section has a predominantly circular inlet cross-section. However, the operating sections can also be designed to form a through-flow opening with a non-circular shape.

The two element parts are disposed jointly fixed on an element end in the air-guiding section, wherein a relative movement of the element parts, can be brought about in particular in an opposing direction. The advantage is the fixing of the operating element at a single point in the air-guiding section.

Provided that the element parts are mirror-symmetrical, they can be produced inexpensively in large numbers.

In a further embodiment of the air-guiding section, the operating element is designed to be movable with the aid of a positive guide. In other words, this means that a slotted guide is formed which permits a clear and therefore secured movement of the operating element to be achieved. In particular, provided that the positive guide is formed as a curved groove in the air-guiding section, jamming of the cross-section-changing unit can be avoided.

In a construction of the cross-section-changing unit, which is less expensive because it is simple, the element parts and the movement elements operatively connecting element parts to the adjusting unit are connected to each other with the aid of a pin connection. Pin connections are a reliable connection, in particular between two components designed to be able to move with respect to each other. The pin connection can be formed in a rivet connection and/or with the aid of a securing element so that the at least two components are designed to be able to be captively moved with the pin and relative to each other and to the pin.

In a further embodiment of the air-guiding section, the movement elements connecting the element parts to the adjusting unit extend in a straight line, whereby a stable cross-section-changing unit is produced while keeping production inexpensive.

A second aspect of the disclosure relates to an exhaust turbocharger comprising an exhaust gas guiding section which can have a flow passing through it and an air-guiding section which can have a flow passing through it. In the exhaust gas guiding section, a turbine wheel is rotatably received in a wheel chamber of the exhaust gas guiding section. In the air-guiding section, a compressor wheel is likewise rotatably received in a wheel chamber of the air-guiding section, wherein the turbine wheel is connected to the compressor wheel for conjoint rotation therewith. The air-guiding section is designed as claimed. In comparison with the prior art, the air-guiding section leads to a shifting of the surge limit of the exhaust turbocharger so that an increase towards smaller mass flows through the air-guiding section is possible. All in all, in the region of the small mass flows, the level of efficiency of the exhaust turbocharger increases and consequently a reduction in internal combustion engine-specific emissions of an internal combustion engine connected to the exhaust turbocharger can be brought about.

Further advantages, features and details will be apparent from the following description of preferred a preferred exemplified embodiment and with reference to the drawing. The features and combinations of features mentioned earlier in the description, and the features and combinations of features mentioned hereinunder in the description of the figure and/or illustrated in the figure alone can be employed not only in the combination stated in each case but also in other combinations or on their own.

DETAILED DESCRIPTION

Figure 1A:
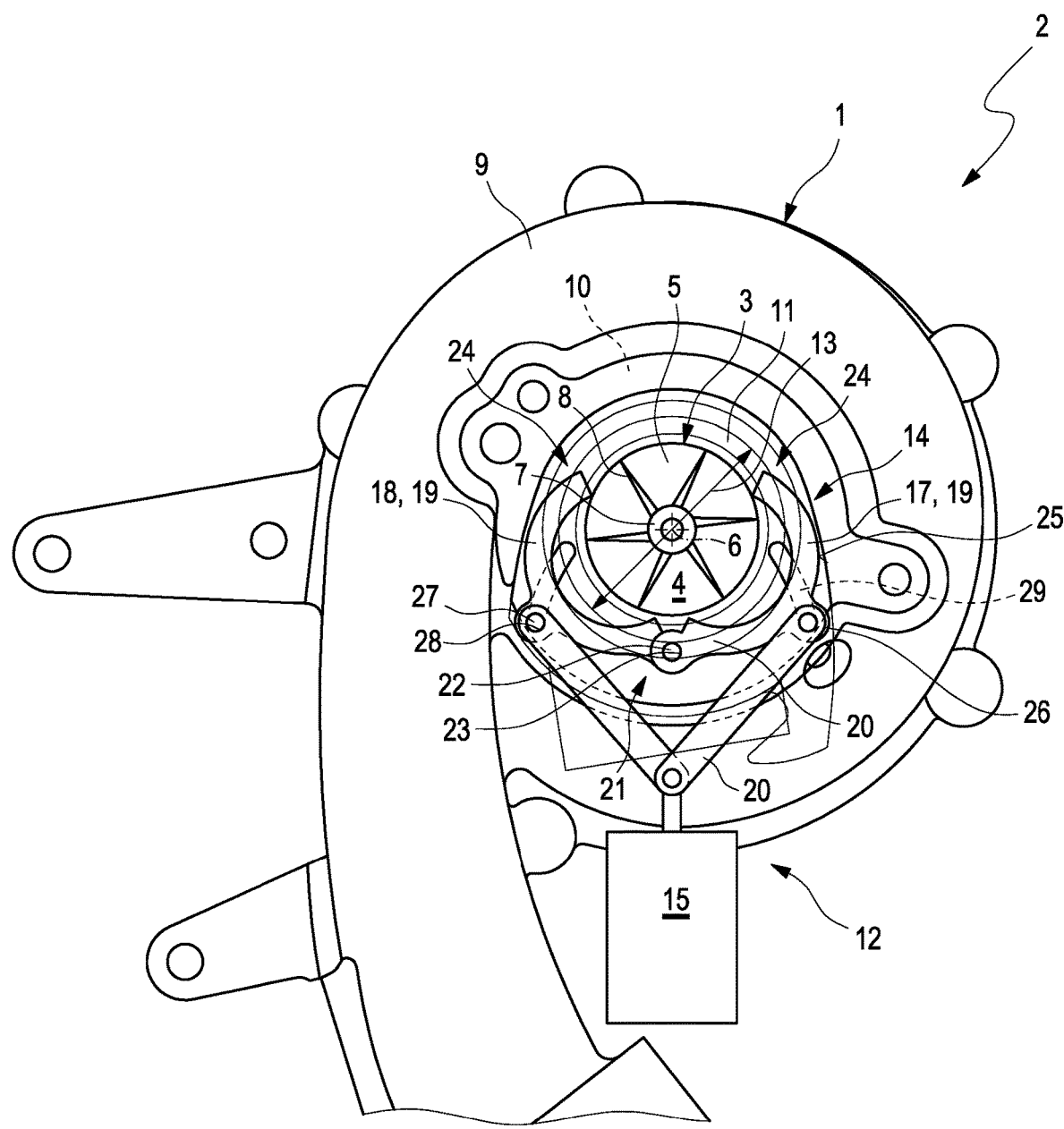
FIG. 1 illustrates a longitudinal cross-sectional view of first exemplified embodiment of an air-guiding section with an inlet channel in a completely opened position of a cross-section-changing unit.
Figure 1:
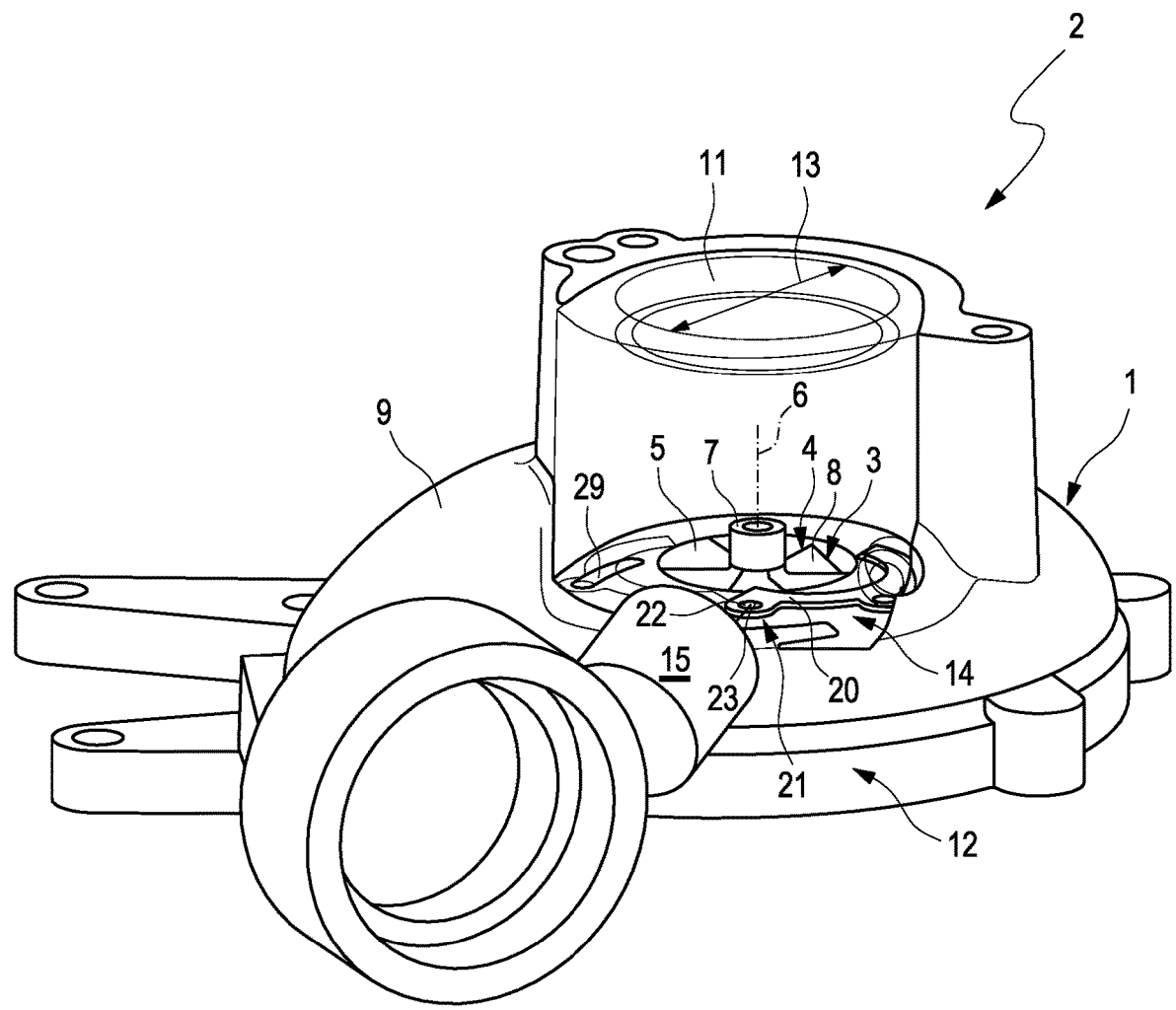

A first exemplified embodiment of an air-guiding section 1 of an exhaust turbocharger 2 which is designed to be able to have a flow passing through it is illustrated in FIG. 1. The air-guiding section 1 is disposed in an intake line of an internal combustion engine, not illustrated in more detail, wherein the internal combustion engine is e.g. a spark ignition engine or a diesel engine. The exhaust turbocharger 2 further has an exhaust gas guiding section, which can have a flow passing through it and is not illustrated in more detail, and a bearing section, not illustrated in more detail, wherein the air-guiding section is received in an intake tract, not illustrated in more detail, of the internal combustion engine so that it can have a flow passing through it.

The exhaust turbocharger 2 comprises a rotor assembly 3 which comprises a compressor wheel 4 for drawing in and compressing combustion air, a turbine wheel, not illustrated in more detail, for expansion of exhaust gas, and a shaft, which is not illustrated in more detail and connects the compressor wheel 4 to the turbine wheel for conjoint rotation therewith. The shaft is rotatably mounted in the bearing section of the exhaust turbocharger 2 which is positioned between the air guiding section 1 and the exhaust gas guiding section.

In order for the exhaust gas to flow into the exhaust gas guiding section, this section comprises at least one spiral channel, not illustrated in more detail, and an inlet channel, not illustrated in more detail, formed upstream of the spiral channel in the exhaust gas guiding section. The inlet channel serves to condition the exhaust gas which causes the turbine wheel to rotate during operation of the internal combustion engine. With the aid of the shaft, the compressor wheel 4 is likewise caused to rotate and so combustion air is drawn in and compressed thereby.

The compressor wheel 4 is received in a wheel chamber 5 of the air-guiding section 1 so as to be able to rotate about its axis of rotation 6 and comprises, on a hub 7, a plurality of rotor disk blades 8. Downstream of the wheel chamber 5, an annular spiral channel 9 designed to surround the compressor wheel 4, wherein, between the spiral channel 9 and the wheel chamber 5, a diffuser channel 10 is formed for further conditioning of the fluid taken in and compressed by the compressor wheel 4. Upstream of the wheel chamber 5, the air-guiding section 1 comprises an inlet channel 11, via which the fluid to be compressed can flow in.

A cross-section-changing unit 12 for changing the inlet cross-section 13 of the inlet channel 11 is disposed in the inlet channel 11. The cross-section-changing unit 12 comprises an operating element 14 and an adjusting unit 15 which can move the operating element 14.

The operating element 14 is formed as a type of baffle and, in the present exemplified embodiment, comprises two movable element parts 17, 18, a first element part 17 and a second element part 18, which are disposed in a position narrowing the inlet cross-section 13, a closed position of the operating element 14, in order to produce an annular baffle 16. In other words, this means that in the closed position, owing to the positioning of the element parts 17, 18, the annular baffle 16 is formed.

In the present exemplified embodiment, operating sections 19 of the two element parts 17, 18 are in the form of annular segments, wherein the element parts 17,18 comprise movement elements 20 in the form of lever arms so that the operating sections 19 produce the annular baffle 16.

The annular baffle 16 is not to be understood to mean that it is also closed in the axial direction along the axis of rotation 6. At this location, the operating sections 19 can come into mutual contact, they can also be formed spaced apart from each other.

Similarly, the number of operating sections 19 or the number of element parts 17, 18 comprising same is not limited to two. These can be designed to overlap on one side and also on both sides, in particular in the closed position. Similarly they can be formed in one plane and also in different planes.

In the completely opened position, as illustrated in FIGS. 1a and 1b, in particular the operating sections 19 are disposed fully releasing the inlet cross-section 13.

Figure 2:
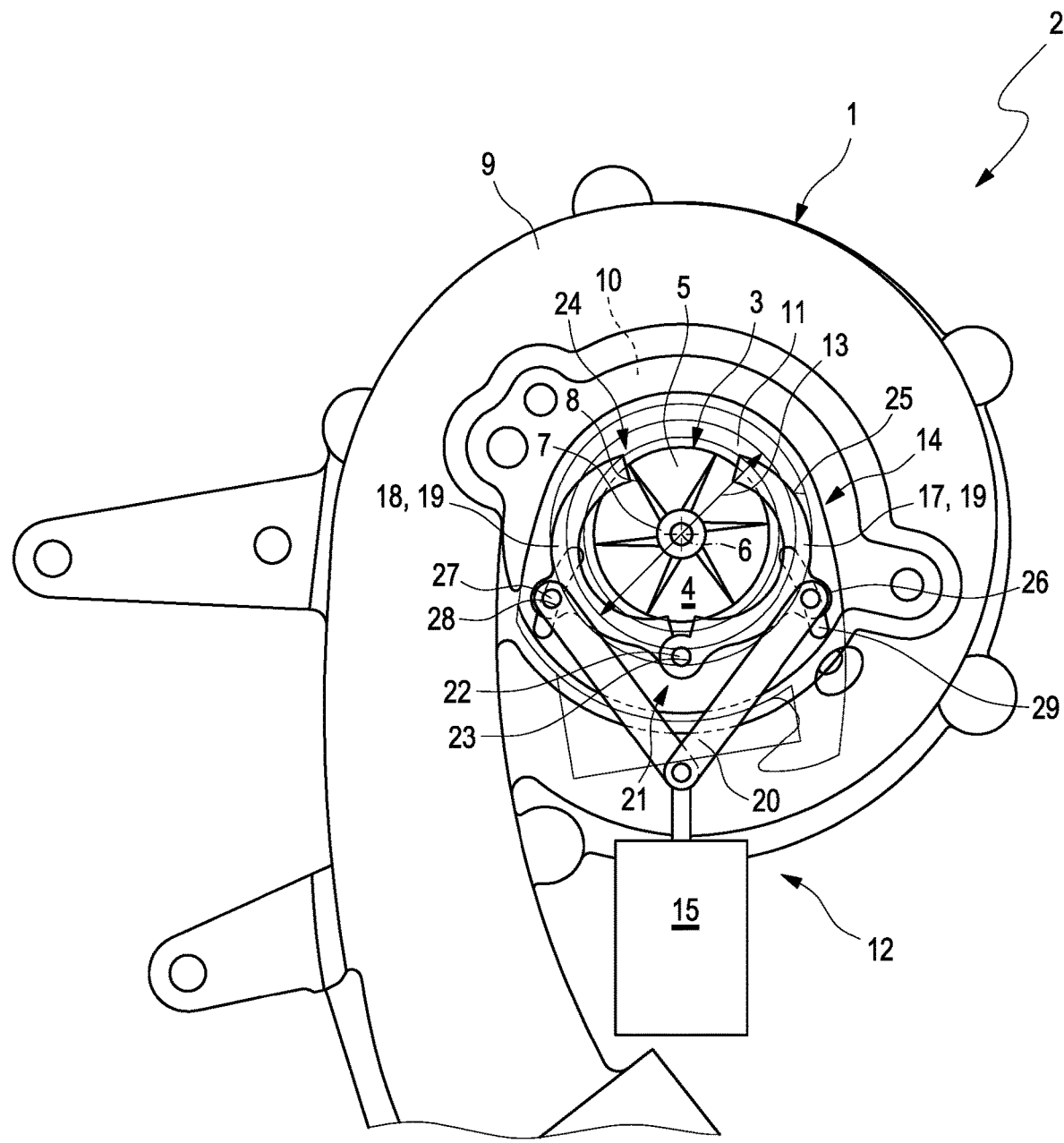
FIG. 2 illustrates a longitudinal cross-sectional view of the air-guiding section according to FIG. 1 with the inlet channel in a partially narrowing position of the cross-section-changing unit.
Figure 2:
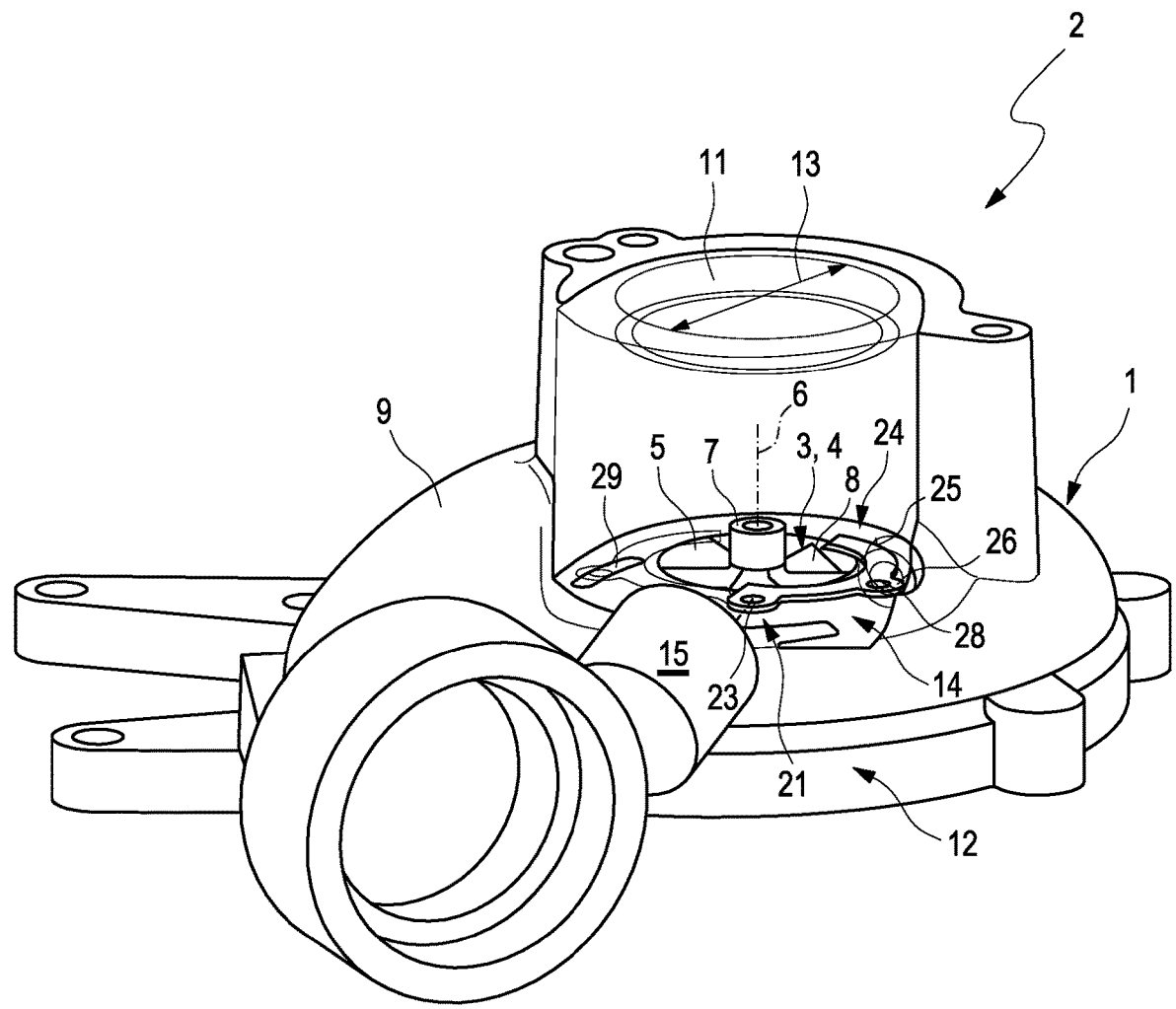
Figure 3:
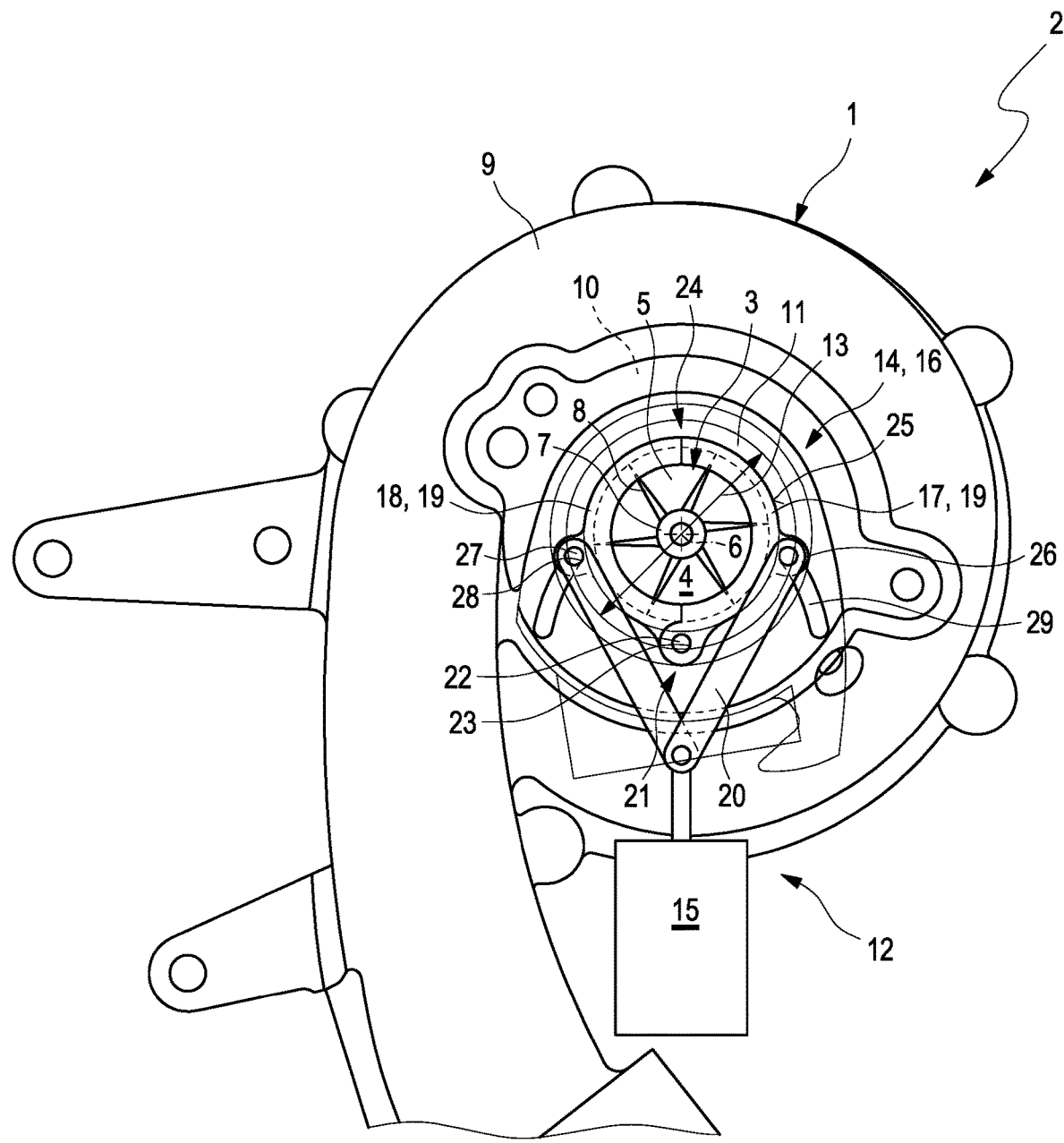
FIG. 3 illustrates a longitudinal cross-sectional view of an air-guiding section with an inlet channel in a completely narrowing position of the cross-section-changing unit.
Figure 3:
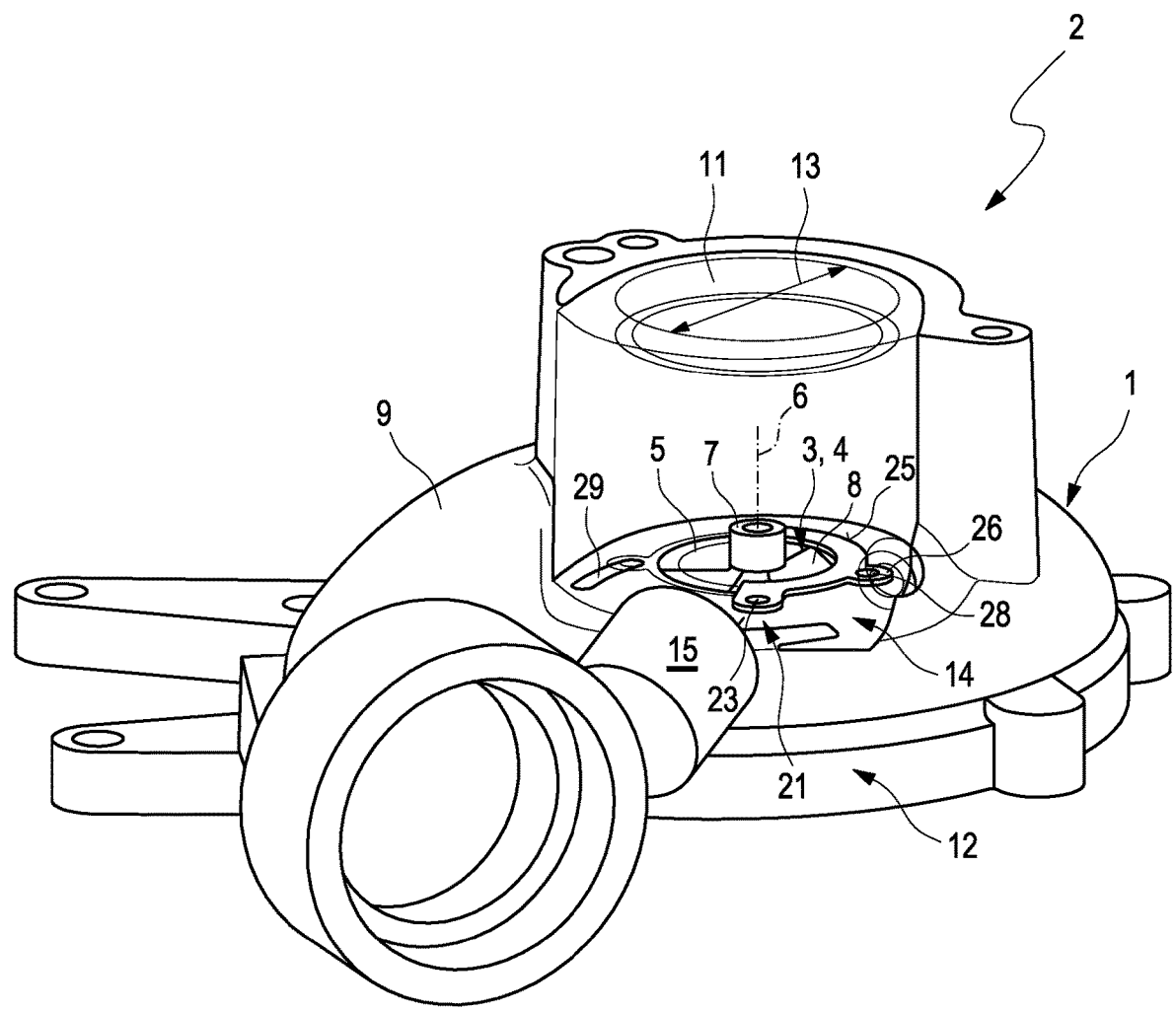

In FIGS. 2a and 2b, the operating sections 19 are disposed partially reducing the inlet cross-section 13 in the direction towards the compressor wheel 4. In FIGS. 3a and 3b, the operating sections 19 are disposed in their completely closed position, narrowing the inlet cross-section 13. The completely closed position is not to be understood in such a way that the inlet cross-section 13 is completely closed. This would lead to a negative pressure during rotation of the rotor assembly 3, which could lead to damage on the rotor assembly 3. The operating sections 19 are disposed to have a maximum effect of reducing the inlet cross-section 19 at their position.

The operating element 14 of the first exemplified embodiment is pincer-shaped. In other words, this means that the two element parts 17, 18 are designed to be able to move with each other and relative to each other at only one of their opposing first element ends 21. For this purpose, the movement elements 20 formed on these first element ends 21 are connected with the aid of a pin 22 which is disposed in a respective receiving opening 23 of the movement elements 20 so as to be able to bring about a relative movement of the two element parts 17, 18 with respect to each other.

The pin 22 is immovably received in the air-guiding section 1, whereby fixing of the operating element 14 in the region of the first element ends 21 is brought about.

At their second element ends 24, formed remote from the first element ends 21, the two element parts 17, 18 are formed independently of each other, whereby, when the operating element 14 is in the partially or completely opened state, a shape similar to an opened pincer shape is formed.

For jamming-free movement of the operating element 14, the adjusting unit 15 is formed operatively connected to the movement elements 20 which are spaced apart from the movement elements 20 at the first element end 21 and which are formed operatively connected to the element parts 17, 18. In order to produce the operative connection between the element parts 17,18 and these movement elements 20, the operating sections 19 each comprise a receiving element 26 on their outer surface 25, which receiving element serves for movable connection of the movement element 20 and of the element part 17; 18. The receiving element 26 is formed as an eyelet, wherein, with the aid of a further pin 17, a simple connection to the movement element 20 is produced. The further pin 27 is received in a further receiving opening 28 of the movement element 20 in such a way that the further pin 27 forms an operative connection between the movement element 20 and the corresponding element part 17; 18.

The further pin 27 is disposed in a positively guided manner in a groove 29, wherein the groove 29 is formed in the air-guiding section 1. For the purposes of simplified production, in an exemplified embodiment not illustrated in more detail, the groove 29 is formed in an insert element in the form of an annular disk which can be placed into the inlet channel 11. Therefore, a slotted guide is produced which is used for jamming-free movement of the operating element 14.

In the present first exemplified embodiment, the adjusting unit 15 is disposed adjacent to the first element end 21. Similarly, it could also be positioned adjacent to the second element ends 24.

Figure 4:
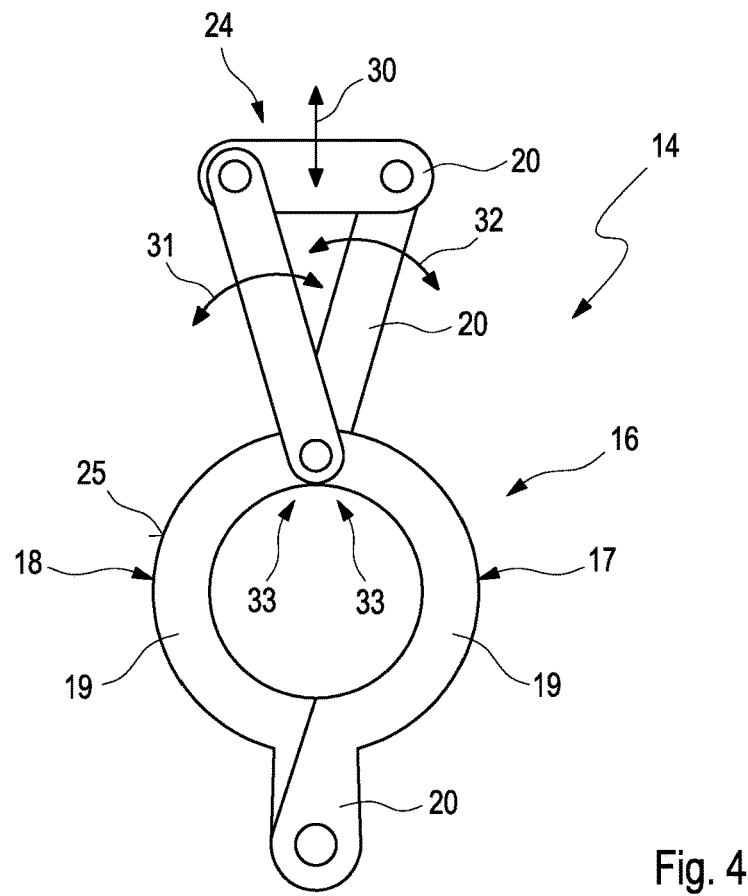
FIG. 4 illustrates a plan view of second exemplified embodiment of an operating element of the cross-section-changing unit of the air-guiding section in its completely narrowing position.
Figure 5:
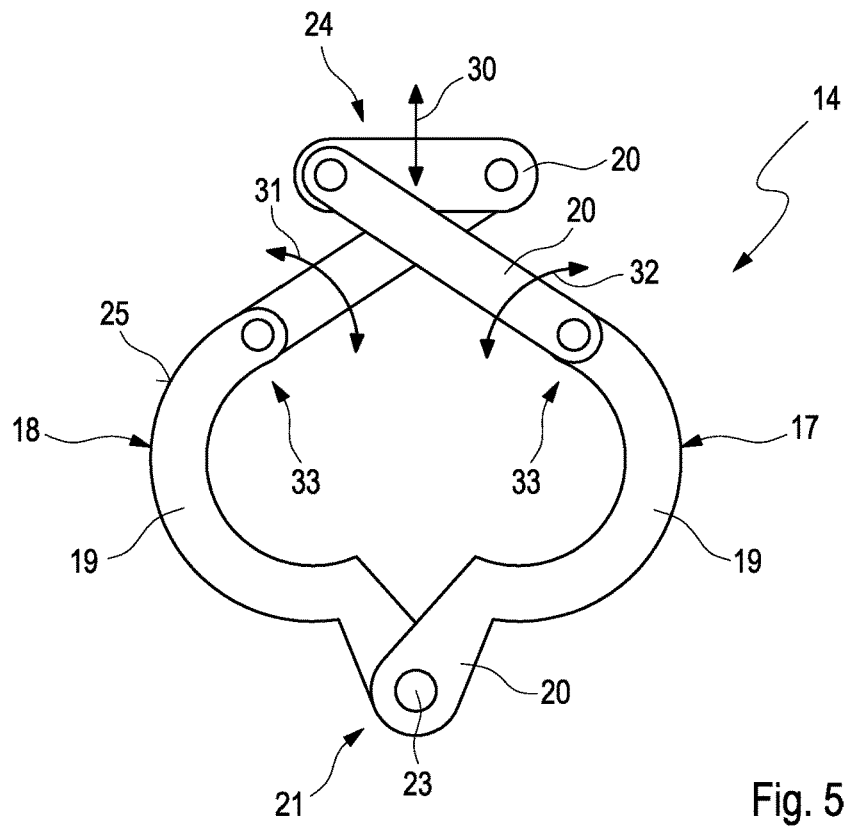
FIG. 5 illustrates a plan view of the operating element according to FIG. 4 in a completely opened position.

FIGS. 4 and 5 illustrate a second exemplified embodiment of the operating element 14 of the air-guiding section 1 in its position reducing the inlet cross-section 13 to a maximum degree and in the position completely releasing the inlet cross-section 13 respectively. The operating sections 19 are partially fixed to the movement elements 20 and designed to be partially movable relative to each other. At the second element end 24—remote from the first element end 21—of the element parts 17, 18, the two operating sections 19 of the element parts 17, 18 are connected to each other via further movement elements 20. In the present second exemplified embodiment, three movement elements 20 lie in the region of the second element end 24 and are connected to each other and to the element parts 17, 18 so as to be movable relative to each other. Two of the three movement elements 20 are movably connected at their ends to the operating sections 19 of the operating element 14, wherein, at their ends remote from these ends, they are connected to the movement element 20 so as to be movable with respect to each other. With the aid of the third movement element 20, stability during the adjustment of the operating sections 19 is brought about, wherein the third movement element 20, which is designed to connect the two other movement elements 20 to each other, is designed to exert a translational movement in the direction of the first arrow 30 and the two other movement elements 20 are designed to exert a rotational movement in the direction of the second arrow 31 and the third arrow 32 respectively.

Both exemplified embodiments presented comprise element parts 17, 18 which, in the closed state, therefore with the smallest possible inlet cross-section 13, at their element part ends 33 nearer the second element end 24, are designed to be at least in contact and preferably to overlap over an angular range of at least 2°.

In the setting of the completely released inlet cross-section 13, the movement elements 20 and in particular the adjusting unit 15 lie completely outside the inlet cross-section 13, as do the element parts 17, 18 themselves.

The mutually opposing element part ends 33 of the element parts 17, 18 and/or of the movement elements 20 can be smooth and/or contoured, e.g. in the form of a tongue and groove engagement, and/or be formed with, in particular, elastic damping elements in order to avoid acoustically noticeable clashing.

In particular, the operating sections 19 but also the whole operating element 14 can be contoured in particular at their surfaces within the flow, e.g. they can be chamfered or rounded, for better flow guidance.

In the two above-described exemplified embodiments, the operating element 14 is in the form of a disk-shaped baffle. Similarly, however, it could also be formed in a sleeve-like manner over a specific axial extension, i.e. in other words, in the closed state, and render possible flow guidance over the corresponding axial extension.

Different adjusting units 15 for positively guiding the movement of the operating element 14 are feasible. Thus, in the exemplified embodiments, both a purely rotational movement of the operating element 14 according to the first exemplified embodiment and a translational and rotational movement of the operating element 14 as explained in the second exemplified embodiment are provided.

Similarly, the movement of the operating element 14 can be damped or in particular the movement can be brought about in a controlled manner so that acoustically disturbing noises are avoided. In other words, this means that damping properties and/or control of the speed gradient "just before closing" of the operating element 14 (in order to avoid acoustically disturbing clashing of the individual elements upon reaching the closing position) of the adjusting unit 15 are provided.

The movement elements 20 are designed to bring about inexpensive production in a strip or rod shape with extension in a straight line.

The invention claimed is:

1. An exhaust turbocharger, comprising:
   an air-guiding section (1);
   a wheel chamber (5) for rotatable reception of a compressor wheel (4) having a plurality of rotor disk blades (8);
   a spiral channel (9) formed downstream of the wheel chamber (5) in the air-guiding section (1);
   a diffuser channel (10) formed in the air-guiding section (1) between the wheel chamber (5) and the spiral channel (9);
   an inlet channel (11) formed in the air-guiding section (1) upstream of the wheel chamber (5) for an inflow of fluid to be compressed; and
   a cross-section-changing unit (12) for changing an inlet cross-section (13) of the inlet channel (11) disposed in the inlet channel (11),
   wherein the cross-section-changing unit (12) comprises an operating element (14) which comprises
      at least two movable element parts (17, 18) to produce a baffle (16), the at least two movable element parts
         configured to protrude, supported by an adjusting unit (15), into the inlet cross-section (13) rotationally and/or in a translational manner or configured to be completely removed from the inlet cross-section (13), and wherein the element parts (17, 18) are fixedly disposed at one element end (21) jointly in the air-guiding section (1), and wherein a relative movement of the element parts (17, 18) can be brought about in an opposing direction.

2. The exhaust turbocharger as claimed in claim 1, wherein the element parts (17, 18) comprise operating sections (19) which face each other in order to form a through-flow opening.

3. The exhaust turbocharger as claimed in claim 2, wherein the operating sections (19) form a circular periphery when the operating element (14) is in a closed state.

4. The exhaust turbocharger as claimed in claim 1, wherein the element parts (17) are mirror-symmetrical.

5. The exhaust turbocharger as claimed in claim 1, wherein the operating element (14) can be moved within a positive guide (29).

6. The exhaust turbocharger as claimed in claim 5, wherein the positive guide (29) has the form of a curved groove (29) in the air-guiding section (1).

7. The exhaust turbocharger as claimed in claim 1, wherein the element parts (17, 18) and the movement elements (20) operatively connecting the element parts (17, 18) to the adjusting unit (15) are connected to each other with a pin connection.

8. The exhaust turbocharger as claimed in claim 1, wherein the movement elements (20) connecting the element parts (17, 18) to the adjusting unit (15) extend in a straight line.

* * * * *